United States Patent
Wang et al.

(10) Patent No.: US 11,574,254 B2
(45) Date of Patent: Feb. 7, 2023

(54) ADAPTIVE ASYNCHRONOUS FEDERATED LEARNING

(71) Applicant: International Business Machines Corporation, Armonk, NY (US)

(72) Inventors: Shiqiang Wang, White Plains, NY (US); Tiffany Tuor, London (GB); Changchang Liu, White Plains, NY (US); Thai Franck Le, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 16/861,284

(22) Filed: Apr. 29, 2020

(65) Prior Publication Data
US 2021/0342749 A1 Nov. 4, 2021

(51) Int. Cl.
*G06N 20/20* (2019.01)

(52) U.S. Cl.
CPC .................... *G06N 20/20* (2019.01)

(58) Field of Classification Search
CPC ...................................... G06N 20/20
See application file for complete search history.

(56) References Cited

U.S. PATENT DOCUMENTS

| | | |
|---|---|---|
| 8,204,840 B2 | 6/2012 | Patil et al. |
| 2018/0007178 A1* | 1/2018 | Subhraveti ............ G06F 9/541 |
| 2018/0173747 A1* | 6/2018 | Baird, III ................ G06F 16/27 |
| 2019/0138934 A1* | 5/2019 | Prakash .................. G06V 10/95 |
| 2019/0385043 A1* | 12/2019 | Choudhary ............ G06F 16/256 |
| 2020/0059369 A1* | 2/2020 | Li .......................... H04L 9/3247 |
| 2020/0162264 A1* | 5/2020 | Zamani ................. H04L 9/3247 |

OTHER PUBLICATIONS

Ammad-Ud-Din, M. et al., "Federated Collaborative Filtering for Privacy-Preserving Personalized Recommendation System," EU Cloud R&D Center of Helsinki, Huawei Technologies, Finland, Jan. 29, 2019, 12 pages.

Anonymous, "User Interface and Application Programming Interface for Explaining Personalized Machine-Learned Model Outputs," IPCOM000252271D, Jan. 3, 2018, 34 pages.

(Continued)

*Primary Examiner* — Abdullahi E Salad
(74) *Attorney, Agent, or Firm* — Cantor Colburn LLP; Joseph Petrokaitis

(57) ABSTRACT

Techniques for adaptive asynchronous federated learning are described herein. An aspect includes providing a first version of a global parameter to a first client and a second client. Another aspect includes receiving, from the first client, a first gradient, wherein the first gradient was computed by the first client based on the first version of the global parameter and a respective first local dataset of the first client. Another aspect includes determining whether the first version of the global parameter matches a most recent version of the global parameter. Another aspect includes, based on determining that the first version of the global parameter does not match the most recent version of the global parameter, selecting a version of the global parameter. Another aspect includes aggregating the first gradient with the selected version of the global parameter to determine an updated version of the global parameter.

20 Claims, 7 Drawing Sheets

(56) References Cited

OTHER PUBLICATIONS

Brasher, R. et al., "Sometimes You Want to Go Where Everybody Knows Your Name: A Metric for Personalization," arXiv:1801.10182v1 [cs.LG] Jan. 30, 2018, 9 pages.
Chahal, K. et al., "A Hitchhiker's Guide On Distributed Training of Deep Neural Networks," arXiv:1810.11787v1 [cs.LG] Oct. 28, 2018, 14 pages.
IBM et al., "Automated and Adaptive Configuration of Servers in Federation Systems," IPCOM000176367D, Nov. 14, 2008, 13 pages.
Wang, S. et al., "When Edge Meets Learning: Adaptive Control for Resource-Constrained Distributed Machine Learning," IEEE Infocom 2018—IEEE Conference on Computer Communications, 2018, 14 pages.
Wang, S., et al., "Adaptive Federated Lerning in Resource Constrained Edge Computing Systems," arXiv:1804.05271v3 [cs.DC] Feb. 17, 2019, 20 pages.

* cited by examiner

ADAPTIVE ASYNCHRONOUS FEDERATED LEARNING

STATEMENT REGARDING FEDERALLY SPONSORED RESEARCH OR DEVELOPMENT

This invention was made with Government support under Contract No.: W911NF-16-3-0001 awarded by Army Research Office (ARO). The Government has certain rights in this invention.

BACKGROUND

The present invention generally relates to machine learning, and more specifically, to adaptive asynchronous federated learning in a computer system.

Emerging technologies and applications including Internet of Things (IoT), social networking, and crowd-sourcing generate large amounts of data at the network edge. Machine learning models are often built from the collected data, to enable the detection, classification, and prediction of future events. Due to bandwidth, storage, and privacy concerns, it is often impractical to send all the data to a centralized location.

Machine learning models are trained using a variety of techniques, including, for example, federated learning. Federated learning is often performed in a synchronous manner. In an edge computing system with heterogeneous devices, always waiting for the slowest device wastes time. In cases where the data at different devices are more or less independent and identically distributed, it can be beneficial to allow the fastest device to perform many more model updates than the slowest device. However, when the data at different devices are highly non-independent and identically distributed, this would cause the model to fit the data on the fast devices only.

SUMMARY

Embodiments of the present invention are directed to adaptive asynchronous federated learning. A non-limiting example computer-implemented method includes providing a first version of a global parameter to a first client and a second client. The method also includes receiving, from the first client, a first gradient, wherein the first gradient was computed by the first client based on the first version of the global parameter and a respective first local dataset of the first client. The method also includes determining whether the first version of the global parameter matches a most recent version of the global parameter. The method also includes, based on determining that the first version of the global parameter does not match the most recent version of the global parameter, selecting a version of the global parameter. The method also includes aggregating the first gradient with the selected version of the global parameter to determine an updated version of the global parameter.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
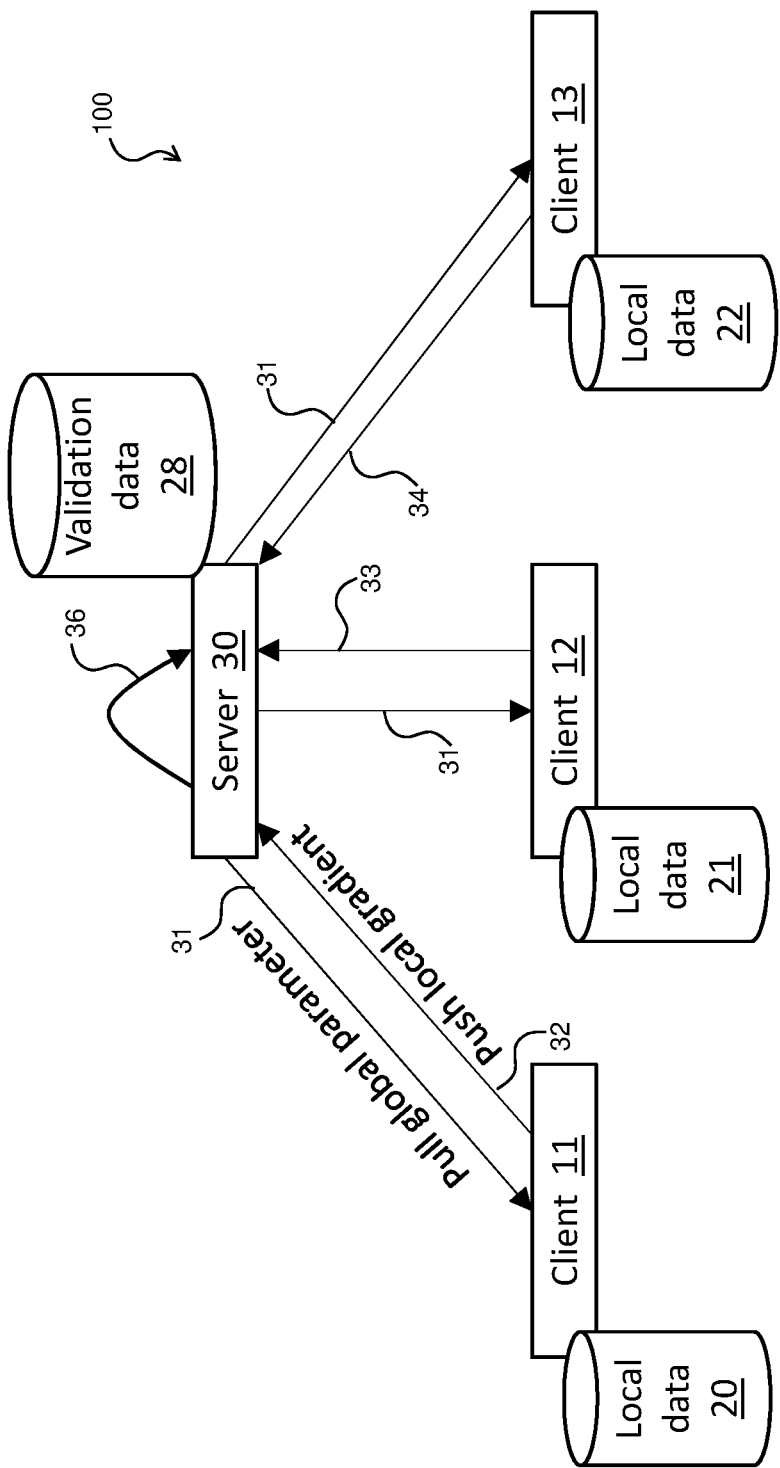
FIG. 1 illustrates a block diagram of components for an adaptive asynchronous federated learning system in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide an asynchronous federated learning technique. In asynchronous distributed machine learning, a parameter server keeps a global parameter vector, and each worker machine, or client, operates in an asynchronous manner to pull the current parameter from the server, compute a gradient on its local dataset, and push the gradient to the server. After receiving the updated gradient from any client, the server performs one step of gradient descent using the received gradient. In aspects of the invention, a computing system includes a server and one or more clients where each client has a local dataset and the server develops a global parameter. The asynchronous federated learning techniques used in the computing system operate according to a methodology, wherein each client is instructed to pull the global model parameter from the server. Each client is further instructed to compute a gradient using its local dataset then push a local gradient to the server. The server updates the global parameter by aggregating the local gradient with an appropriate version of the global parameter; in various embodiments, the local gradient can be aggregated with the current version and/or an earlier version of the global parameter.

Turning now to an overview of technologies that are relevant to aspects of the invention, many modern applications in the area of smart computing are based on machine learning techniques. To train machine learning models, a large amount of data is usually required, which is often not readily available at a central location. Federated learning enables the training of machine learning models from distributed datasets at client devices without transmitting the data to a central place, which has benefits including preserving the privacy of user data and reducing communication bandwidth. However, known approaches to federated learning do not work with all possible data distributions.

One or more embodiments of the present invention address one or more of the above-described shortcomings of the prior art by tracking different versions of the model and selecting a best version of the model. In other words, the server can aggregate a received gradient with multiple versions of global parameters, in which case multiple models will be produced after this aggregation. Out of these multiple models, one model (i.e., one global parameter) will be selected according to the loss or accuracy on a validation dataset. In accordance with aspects of the invention, the best version of the model is determined based on the above-described loss or accuracy on a validation dataset. Such model selection can happen either immediately after aggregating (with multiple versions of global parameters) after one gradient update, or multiple models can coexist for any appropriate amount of time before the best model gets selected. Multiple models may coexist while it is difficult to determine the best model based on the validation dataset, e.g., the loss or accuracy of each of the multiple models based on the validation dataset is relatively close.

Embodiments of the present invention further provide a method for training generic machine learning models (such as deep neural networks or edge computing nodes) from decentralized data. Implementing aspects of embodiments of the invention with asynchronous federated learning is not restricted to the type of data.

Turning now to a more detailed description of aspects of the invention, FIG. 1 depicts an asynchronous federated learning system 100 in accordance with one or more embodiments of the present invention. System 100 can be implemented in conjunction with any appropriate computing device, such as computer system 600 of FIG. 6. The asynchronous federated learning system 100 includes a server 30 and plurality of clients 11, 12 and 13. Each of clients 11, 12 and 13 has a respective local dataset 20, 21 and 22. Embodiments of the server 30 determine and track multiple versions of a global parameter based on gradients 32, 33, and 34 from clients 11, 12 and 13. Gradients 32, 33, and 34 are represented as vectors in some embodiments. The asynchronous federated learning system 100 causes each of clients 11, 12 and 13 to pull a current version of the global parameter 31 from the server 30. The asynchronous federated learning system 100 further causes each of clients 11, 12 and 13 to compute a gradient using the client's respective local dataset 20, 21, and 23 and the received version of the global parameter 31, and causes each of clients 11, 12 and 13 to push the respective computed local gradient 32, 33, and 34 to the server 30. Server 30 also includes validation dataset 28, which may be used to select a best model when multiple models have been generated.

Each of clients 11, 12 and 13 has a respective set of computing resources, and each of clients 11, 12 and 13 can take different amounts of time to compute their respective local gradients 32, 33, and 34. Whenever a gradient (e.g., any of local gradients 32, 33, and 34) is received by the server 30, the asynchronous federated learning system 100 causes the server 30 to update the current version of the global parameter to a new version of the global parameter by aggregating the received local gradient (e.g., any of local gradients 32, 33, and 34) with an appropriate version of the global parameter. The server 30 tracks the versions of the global parameter over time. For example, based on client 11 pushing a gradient 32 to the server 30, the server 30 checks which version of global parameter the client 11 used to compute the received gradient 32. If there is another client (e.g., client 12) that has already pushed a gradient 33 to the server 30 that was computed based on a later version of the global parameter 31, server 30 computes the difference (according to any appropriate distance metric) of the gradient 32 from client 11 and an earlier gradient from client 12, wherein the earlier gradient from client 12 was computed using a same or similar version of the global parameter as the received gradient 32 from client 11. Depending on the determined distance, the server 30 may aggregate the received gradient 32 with either the most recent version of the global parameter or an earlier version of the global parameter. If the distance is relatively small, the data distributions of local dataset 20 and local dataset 21 at the clients 11 and 12 are similar, such that the faster client 12 may be permitted to be ahead of the slower client 11, and the received gradient 32 is aggregated with the most recent version of the global parameter by server 30. If the determined distance is relatively large, the data distributions at client 11 and client 12 are different, such that the server 30 aggregates the received gradient 32 with an earlier version of the global parameter to avoid overfitting the overall model that is described by the global parameter to the local dataset 21 of the faster client 12. Tracking of versions of the global parameter by server 30 is discussed in further detail below with respect to FIG. 2.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., clients, local datasets, additional memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
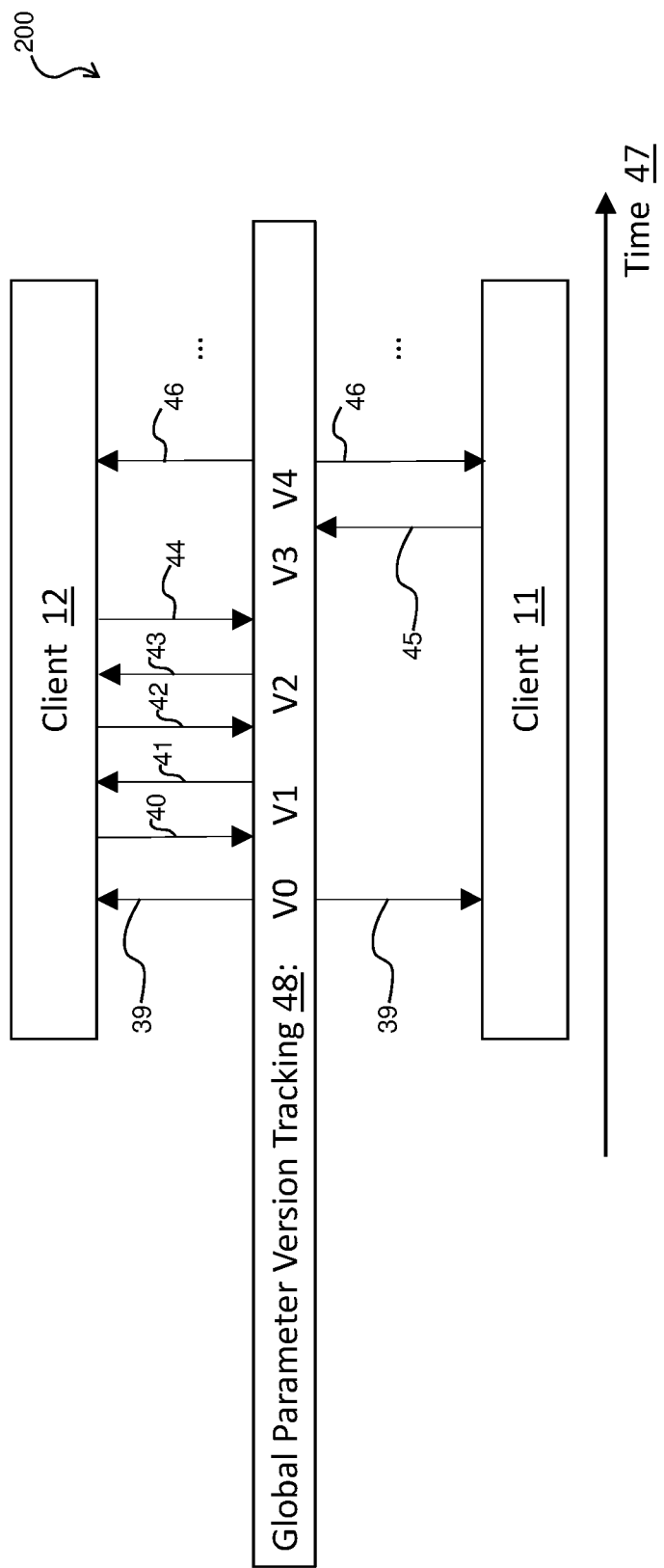
FIG. 2 illustrates a block diagram of components for an adaptive asynchronous federated learning system in accordance with one or more embodiments of the present invention.

FIG. 2 depicts an asynchronous federated learning system 200 in accordance with one or more embodiments of the present invention. Embodiments of system 200 can be implemented in, and are discussed in reference to, system 100 of FIG. 1. System 200 includes a first client 11 and a second client 12 that are in communication with a global parameter version tracking module 48, which is included in server 30 of FIG. 1. As illustrated in system 200, the global parameter version tracking module 48 tracks versions (i.e., V0, V1, V2, V3, and V4) of the global parameter over time 47. Initially, both clients 11 and 12 receive an initial version (V0) 39 of the global parameter from the global parameter version tracking module 48. Client 12 determines a gradient 40 based on V0, and pushes the gradient 40 to the server 30. The server 30 determines a new version (V1) of the global parameter based on the gradient 40, and client 12 receives V1 41 from the global parameter version tracking module 48. Client 12 determines a gradient 42 based on V1 41, and pushes the gradient 42 to the server 30. The server 30 determines a new version (V2) of the global parameter based on the gradient 42, and client 12 receives V2 43 from the global parameter version tracking module 48. Client 12 determines a gradient 44 based on V2 43, and pushes the gradient 44 to the server 30. The server 30 determines a new version (V3) of the global parameter based on gradient 44. Client 11 then pushes gradient 45, which was determined based on V0, to the server 30. Gradients 40, 42, 44, and 45 are each represented as vectors in some embodiments. As illustrated in FIG. 2, client 12 is faster than client 11, and determines multiple gradients (e.g., gradients 40, 42, and 44) before client 11 determines gradient 45.

After receiving gradient 45, the server 30 computes a distance, based on any appropriate distance metric, between gradient 45 and gradient 40, which were both calculated based on V0 39. If the distance is relatively small (e.g., based on comparing the distance to a threshold), gradient 45 is aggregated with global parameter version V3 to determine V4 46, which is provided to each of clients 11 and 12 for determination of an additional respective gradient. If the distance is relatively large (e.g., based on comparing the distance to a threshold), gradients 42 and 44 may be discarded, and gradient 45 is aggregated with global parameter version V1 to determine V4 46, which is provided to each of clients 11 and 12 for determination of an additional respective gradient. Either aggregation will generate a new version (V4) of the global parameter in global parameter version tracking module 48. In some embodiments, based on the distance being relatively large, gradients 42 and 44 from client 12 are discarded. Server 30 can notify client 12 to update at a slower speed if it is determined that the gradients from client 12 are relatively frequently discarded. In some embodiments, if the determined distance is intermediate (e.g., based on comparison to a threshold) the server 30 can perform both aggregations and spin off two models (e.g., two different, separately maintained versions of V4). After further processing of the two models by the asynchronous federated learning system, one model can be selected as a best model by server 30 based on validation dataset 28 of FIG. 1. In some embodiments, an updated version of the global parameter (i.e., model) can be determined by the server 30 based on Equation (EQ.) 1, wherein w(i) is a current version of the model, w(i+1) is a next version of the model, η is a scalar step size, and g is a received local gradient expressed as a vector:

$$w(i+1) \leftarrow w(i) - \eta g. \qquad \text{EQ. 1}$$

It is to be understood that the block diagram of FIG. 2 is not intended to indicate that the system 200 is to include all of the components shown in FIG. 2. Rather, the system 200 can include any appropriate fewer or additional components not illustrated in FIG. 2 (e.g., clients, gradients, global parameter versions, models, additional memory components, embedded controllers, functional blocks, connections between functional blocks, modules, inputs, outputs, etc.). Further, the embodiments described herein with respect to system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3A:
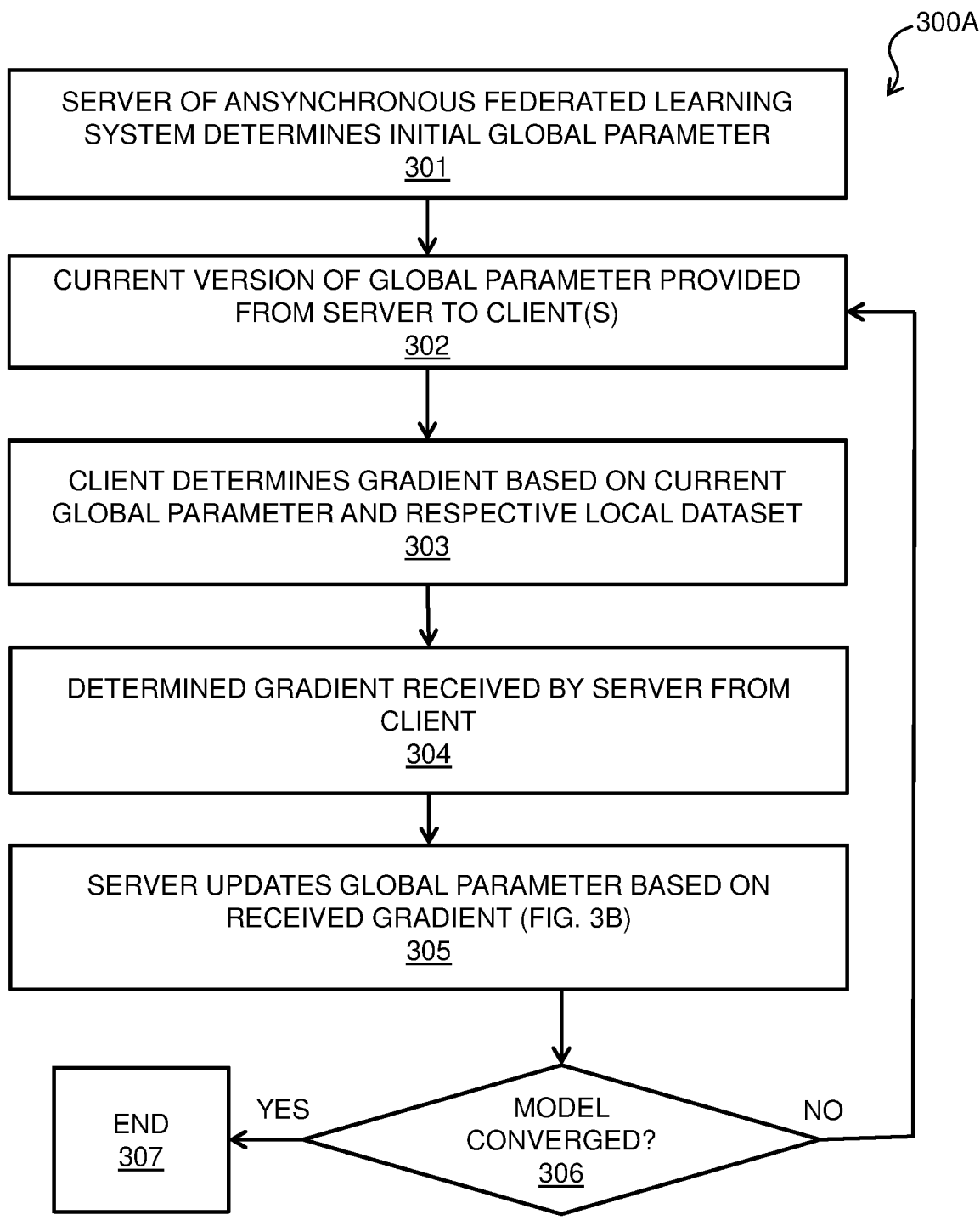
FIG. 3A illustrates a flow diagram of a process for implementing an adaptive asynchronous federated learning technique in accordance with one or more embodiments of the present invention.

Turning now to FIG. 3A, a method 300A including an asynchronous federated learning process is generally shown in accordance with one or more embodiments of the present invention. Embodiments of method 300A as shown in FIG. 3A can be implemented by the asynchronous federated learning system 100 shown in FIG. 1. In block 301 a server, such as server 30 of FIG. 1, determines an initial version of a global parameter for an asynchronous federated learning process. In block 302, the initial version of the global parameter that was determined in block 301 is provided from the server to each client (e.g., clients 11, 12, and 13) in the asynchronous federated learning system as a current version of the global parameter. In block 303, each client in the asynchronous federated learning system determines a gradient based on a respective local dataset and the current version of the global parameter. The various clients in the asynchronous federated learning system can take different amounts of time to determine a respective gradient as is performed in block 303. In block 304, a client finishes determining a respective gradient, and provides the gradient to the server. In block 305, the server updates the current version of the global parameter based on the gradient that was received in block 304. Block 305 is discussed in further detail below with respect to method 300B of FIG. 3B. In block 306, it is determined whether the model described by the global parameter has converged based on the updated version of the global parameter. If it is determined that the model has not converged, flow returns from block 306 to block 302, and the updated version of the global parameter that was determined in block 305 is provided to the client as a current version of the global parameter. Blocks 302, 303, 304, and 305 of method 300A are repeated in parallel for each of the clients in the asynchronous federated learning system (e.g., clients 11, 12, and 13 of FIG. 1) until it is determined in block 306 that the model described by the global parameter has converged, at which point flow proceeds to block 307, and method 300A ends.

The process flow diagram of FIG. 3A is not intended to indicate that the operations of the method 300A are to be executed in any particular order, or that all of the operations of the method 300A are to be included in every case. Additionally, the method 300A can include any suitable number of additional operations.

Figure 3B:
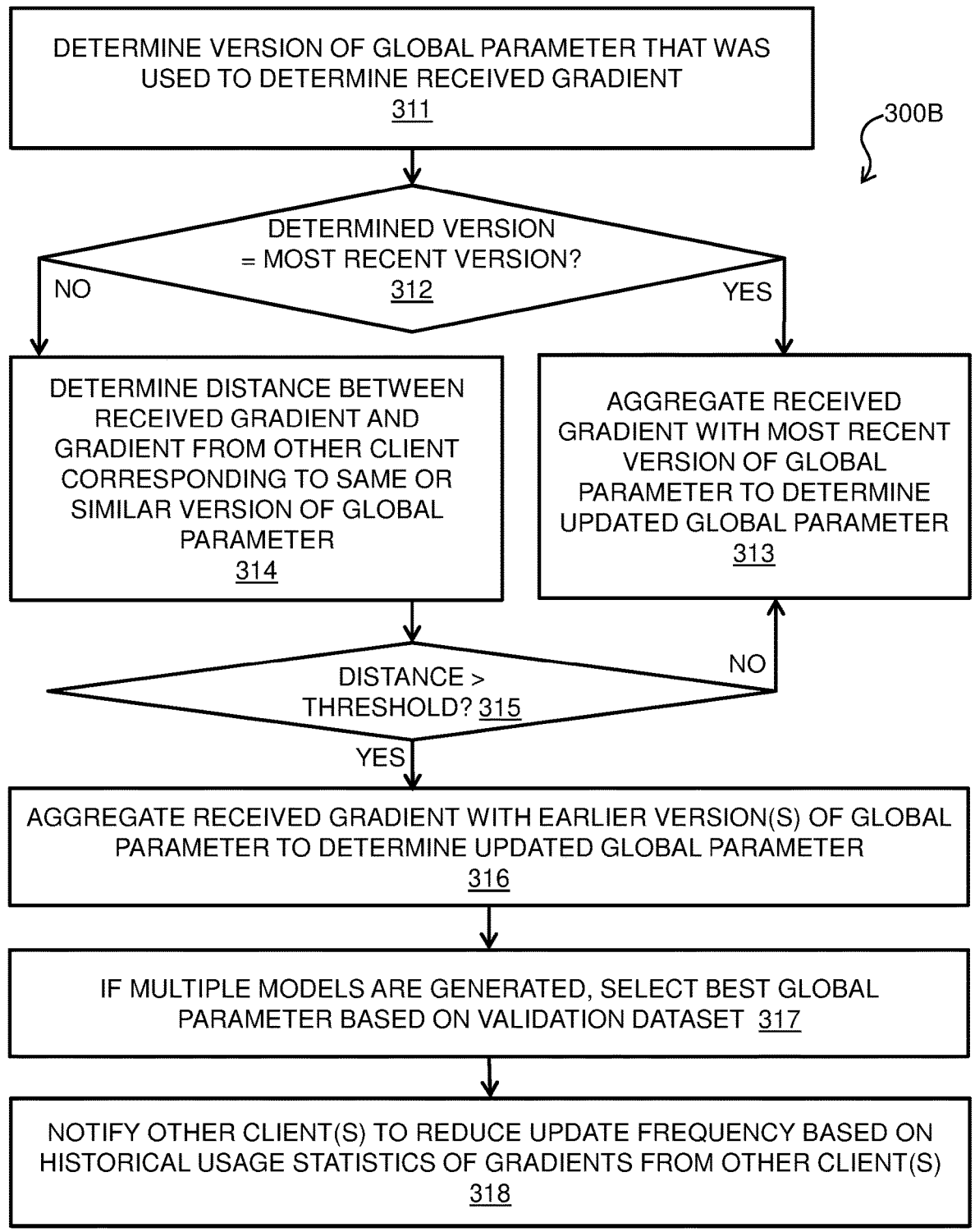
FIG. 3B illustrates a flow diagram of a process for implementing an adaptive asynchronous federated learning technique in accordance with one or more embodiments of the present invention.

Turning now to FIG. 3B, a method 300B including an asynchronous federated learning process is generally shown in accordance with one or more embodiments of the present invention. Embodiments of method 300B as shown in FIG. 3B can be implemented by the asynchronous federated learning system 100 shown in FIG. 1, and can be performed in block 305 of method 300A of FIG. 3A. In block 311 of method 300B, the server (e.g., server 30 of FIG. 1) determines a version of the global parameter that was used to determine the received gradient (i.e., the gradient that was received in a most recent iteration of block 304 of method 300A). In block 312, it is determined whether the determined version of the global parameter from block 311 is the same as a most recent version (i.e., current version) of the global parameter (e.g., as maintained by global parameter version tracking module 48 of FIG. 2). For example, if another client has sent a respective gradient to the server and the global parameter was updated based on the gradient from the other client while the received gradient was being determined, the determined version of the global parameter from block 311 may not match the most recent version of the global parameter.

If it is determined in block 312 that the determined version of the global parameter matches the most recent version of the global parameter, flow proceeds from block 312 to block 313, in which the received gradient is aggregated with the most recent version of the global parameter to determine the updated global parameter. Method 300B then ends, and flow returns from block 313 to method 300A of FIG. 3A.

If it is determined in block 312 that the determined version of the global parameter does not match the most recent version of the global parameter, flow proceeds from block 312 to block 314. In block 314, a distance between the received gradient and another gradient from another client that was determined based on the same or similar version of the global parameter is determined. For example, as illustrated in system 200 of FIG. 2, a distance between gradient 45 from client 11 and gradient 40 from client 12, which were both determined based on V0, is determined in block 314. If there is no gradient in the system 100 that was determined based on the same version of the global parameter as the received gradient, a gradient that was determined based on a closest version of the global parameter by another client may be used to calculate the distance of block 314. The gradients can each be represented as a vector, and the distance between the vectors can be determined in block 314 in any appropriate manner.

In block 315, the distance that was determined in block 314 is compared to a threshold. The threshold may have any appropriate value. If it is determined in block 315 that the distance is less than the threshold, flow proceeds from block 315 to block 313, in which the received gradient is aggregated with the most recent version of the global parameter to determine the updated global parameter. For example, as illustrated in embodiments of system 200 of FIG. 2, gradient 45 is aggregated with V3 to determine V4 in block 313 based on the determined distance between gradient 45 and gradient 40 being relatively small. Method 300B then ends, and flow returns from block 313 to method 300A of FIG. 3A.

If it is determined in block 315 that the distance is greater than the threshold, flow proceeds from block 315 to block 316. In block 316, the received gradient is aggregated with an earlier version of the global parameter to determine an updated global parameter. For example, as illustrated in embodiments of system 200 of FIG. 2, gradient 45 is aggregated with V0 to determine V4 in block 315 based on the determined distance between gradient 45 and gradient 40 being relatively large. In some embodiments of block 316, the received gradient can be aggregated with multiple versions of the global parameter to generate multiple separately-maintained models for processing by the asynchronous federated learning system. The multiple models may each be maintained for any appropriate amount of time, and processing according to methods 300A-B may continue for each of the multiple models in the asynchronous federated learning system.

In block 317, if multiple models were generated in block 316, one of the models may be selected as a best model for further processing by the asynchronous federated learning system based on a validation dataset (e.g., validation dataset 28 of server 30 of FIG. 1); any model that was not selected in block 317 may be discarded. If no model of the multiple models can be selected as the best model (e.g., no model is clearly better than the others), processing of the multiple models according to methods 300A and 300B can continue for any appropriate amount of time until a best model can be identified in block 317. In block 318, a relatively fast client may be notified by the server to reduce the client's update frequency based on one or more gradients that were determined by the relatively fast client being discarded by the processing of blocks 316 and 317. For example, as illustrated in embodiments of system 200 of FIG. 2, if gradient 45 was aggregated with global parameter version V1 to determine V4 in block 315 based on the determined distance between gradient 45 and gradient 40 being relatively large, then gradients 42 and 44 that were determined by client 12 were discarded. Therefore, client 12 can be instructed by server 30 to reduce its update frequency (i.e., frequency of producing new gradients) so as to avoid wasting resources. The server 30 may maintain historical data regarding discarded gradients in order to determine whether to notify clients to reduce their update frequency in block 318. Method 300B then ends, and flow returns from block 318 to method 300A of FIG. 3A.

The process flow diagram of FIG. 3B is not intended to indicate that the operations of the method 300B are to be executed in any particular order, or that all of the operations of the method 300B are to be included in every case. Additionally, the method 300B can include any suitable number of additional operations.

In some aspects of the invention, the asynchronous federated learning methods 300A-B shown in FIGS. 3A-B and the asynchronous federated learning systems 100 and 200 shown in FIG. 1 and FIG. 2 can be implemented in a cloud computing system of the type described in the following paragraphs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
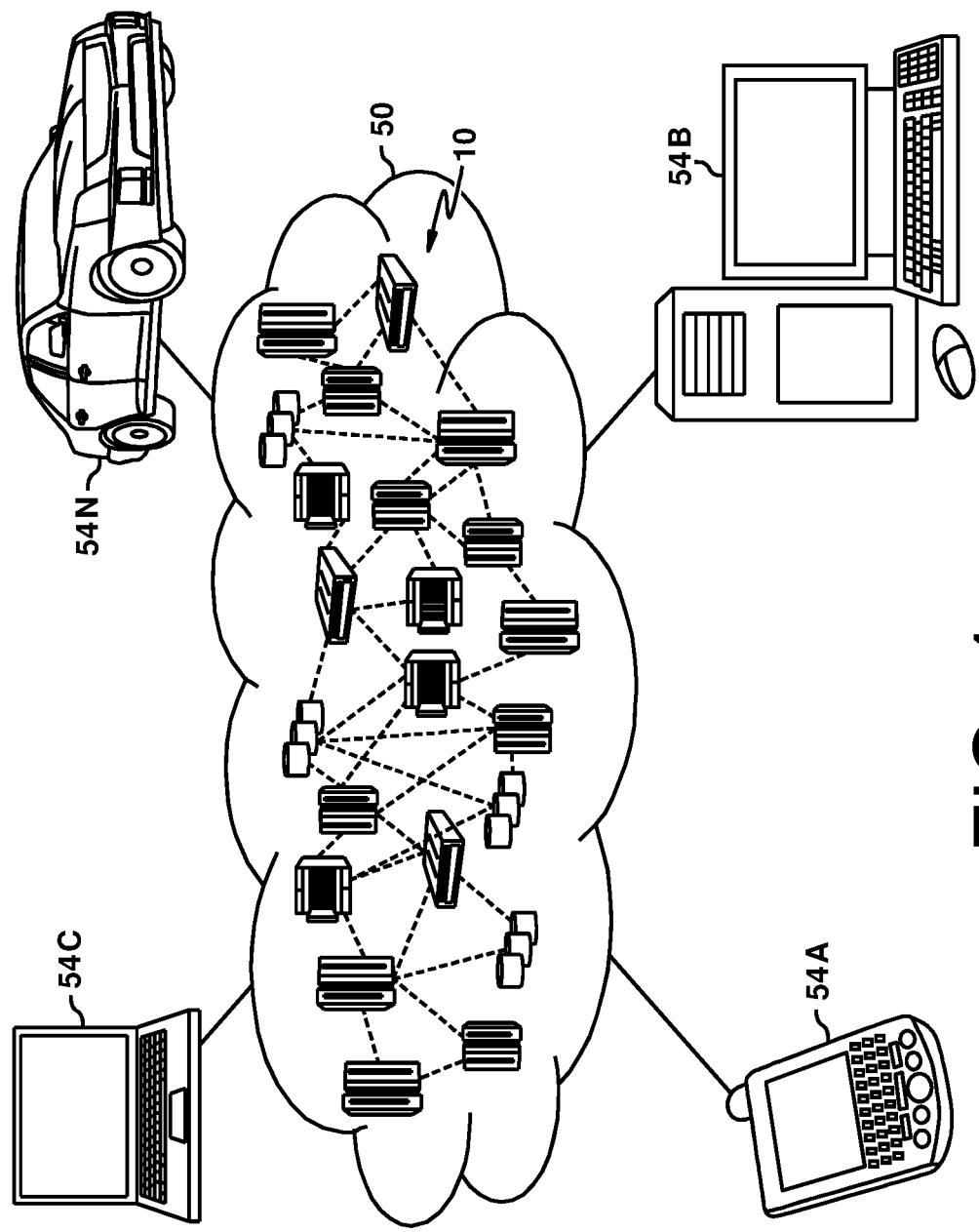
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 49 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 5:
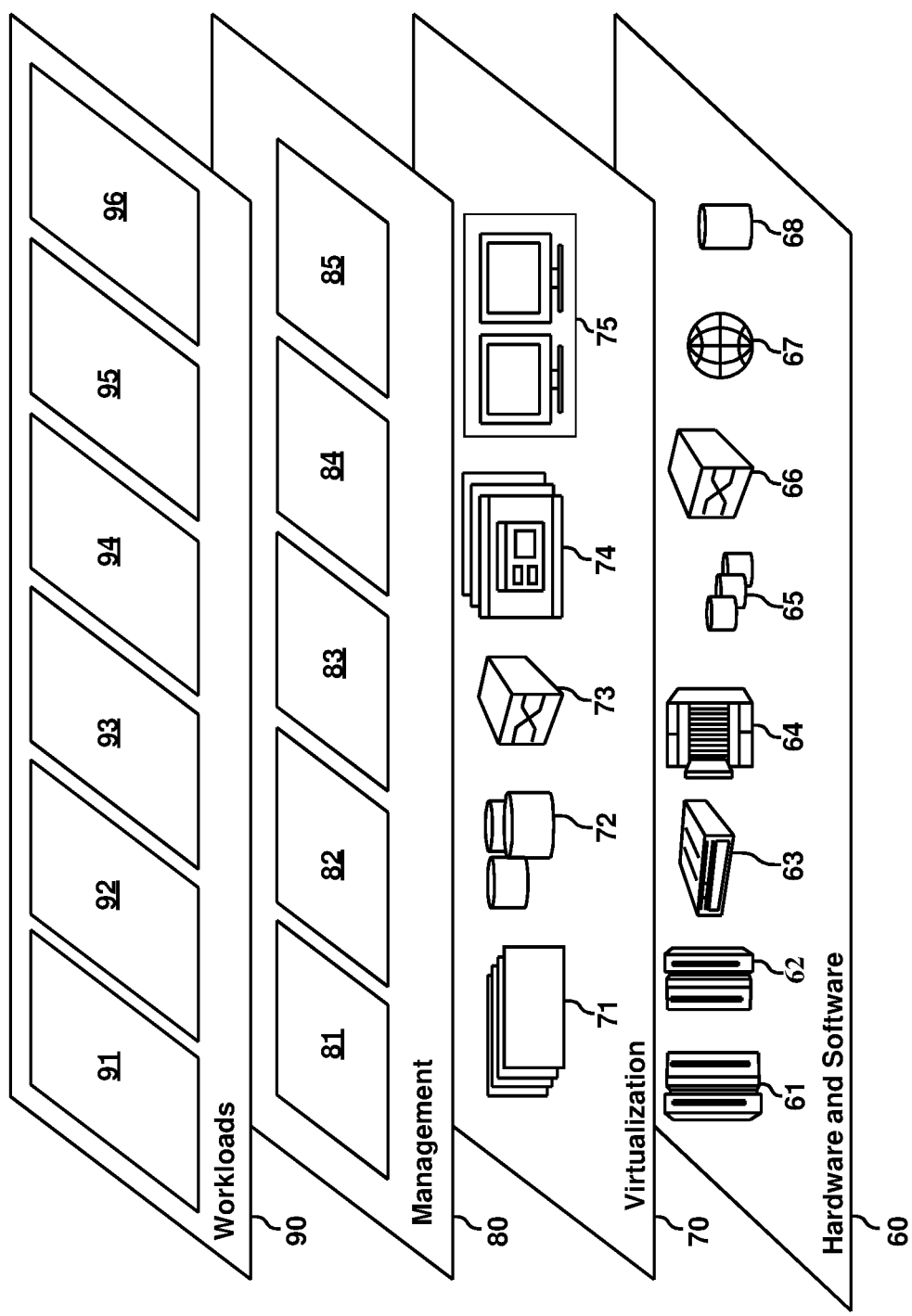
FIG. 5 depicts abstraction model layers according to one or more embodiments of the present invention.

Referring now to FIG. 5, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asynchronous federated learning system 96.

Figure 6:
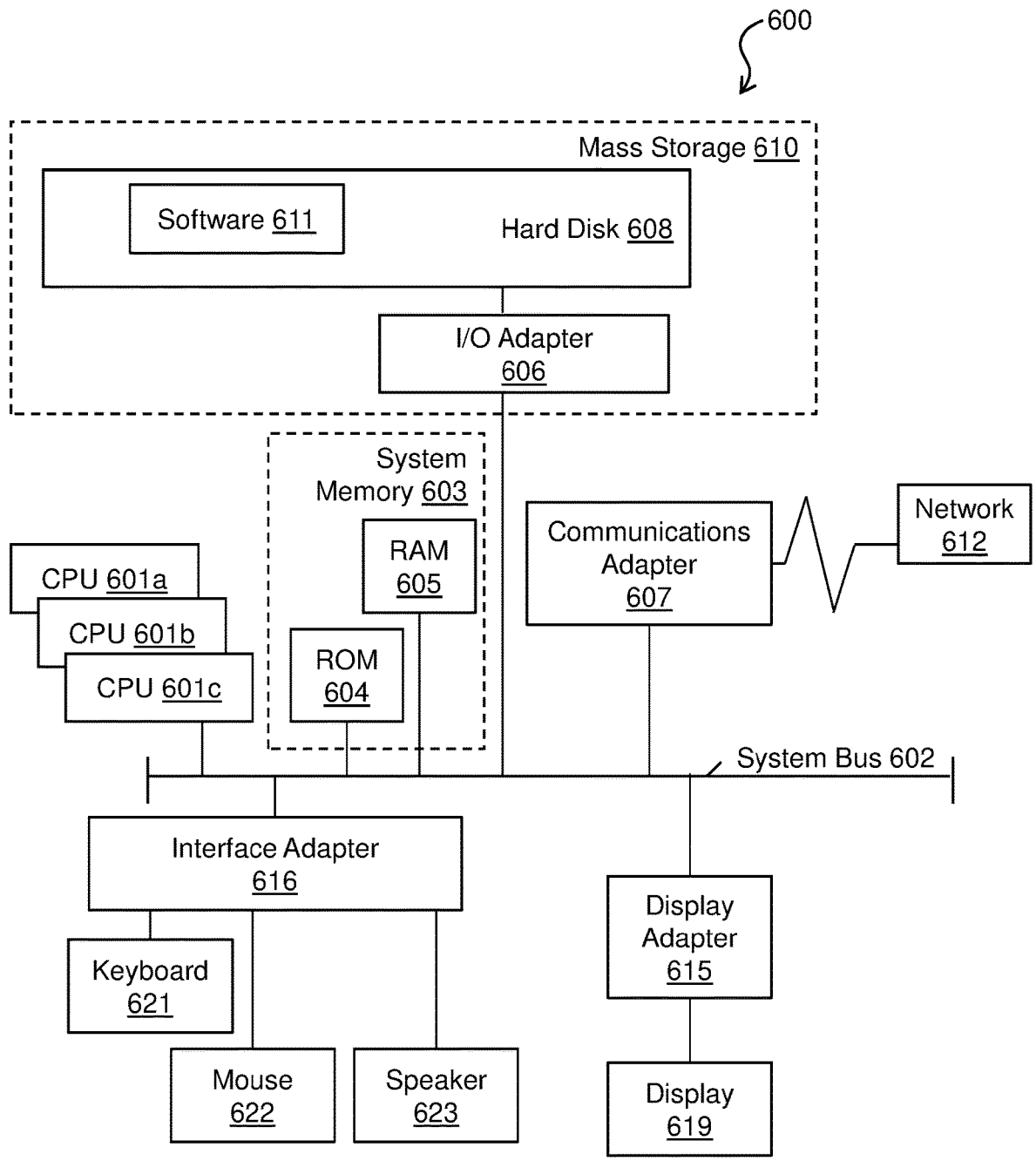
FIG. 6 is a block diagram of a computer system according to one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and, in one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    providing, by a processor, a first version of a global parameter to a first client and a second client;
    receiving, from the first client, a first gradient, wherein the first gradient was computed by the first client based on the first version of the global parameter and a respective first local dataset of the first client;
    determining whether the first version of the global parameter matches a most recent version of the global parameter;
    based on determining that the first version of the global parameter does not match the most recent version of the global parameter, and based on determining a distance between the first gradient and a second gradient of the second client, selecting a version of the global parameter; and
    aggregating the first gradient with the selected version of the global parameter to determine an updated version of the global parameter.

2. The method of claim 1, wherein the second gradient is determined by the second client based on the first version of the global parameter and a respective second local dataset of the second client.

3. The method of claim 2, wherein selecting the version of the global parameter based on the determined distance comprises, based on the determined distance being less than a threshold, selecting the most recent version of the global parameter.

4. The method of claim 2, wherein selecting the version of the global parameter based on the determined distance comprises, based on the determined distance being greater than a threshold, selecting an earlier version of the global parameter.

5. The method of claim 4 further comprising:
    aggregating the first gradient with multiple versions of the global parameter to determine multiple updated versions of the global parameter; and
    selecting, based on a validation dataset, a best version of the global parameter from the multiple updated versions of the global parameter.

6. The method of claim 4 further comprising, based on selecting the earlier version of the global parameter, notifying the second client to reduce an update frequency of the second client.

7. The method of claim 1 further comprising providing the updated version of the global parameter to the first client and the second client.

8. A system comprising:
a memory having computer readable instructions; and
one or more processors for executing the computer readable instructions, the computer readable instructions controlling the one or more processors to perform operations comprising:
providing a first version of a global parameter to a first client and a second client;
receiving, from the first client, a first gradient, wherein the first gradient was computed by the first client based on the first version of the global parameter and a respective first local dataset of the first client;
determining whether the first version of the global parameter matches a most recent version of the global parameter;
based on determining that the first version of the global parameter does not match the most recent version of the global parameter, and based on determining a distance between the first gradient and a second gradient of the second client, selecting a version of the global parameter; and
aggregating the first gradient with the selected version of the global parameter to determine an updated version of the global parameter.

9. The system of claim 8, wherein the second gradient is determined by the second client based on the first version of the global parameter and a respective second local dataset of the second client.

10. The system of claim 9, wherein selecting the version of the global parameter based on the determined distance comprises, based on the determined distance being less than a threshold, selecting the most recent version of the global parameter.

11. The system of claim 9, wherein selecting the version of the global parameter based on the determined distance comprises, based on the determined distance being greater than a threshold, selecting an earlier version of the global parameter.

12. The system of claim 11 further comprising:
aggregating the first gradient with multiple versions of the global parameter to determine multiple updated versions of the global parameter; and
selecting, based on a validation dataset, a best version of the global parameter from the multiple updated versions of the global parameter.

13. The system of claim 11 further comprising, based on selecting the earlier version of the global parameter, notifying the second client to reduce an update frequency of the second client.

14. The system of claim 8, further comprising providing the updated version of the global parameter to the first client and the second client.

15. A computer program product comprising a computer readable storage medium having program instructions embodied therewith, the program instructions executable by one or more processors to cause the one or more processors to perform operations comprising:
providing a first version of a global parameter to a first client and a second client;
receiving, from the first client, a first gradient, wherein the first gradient was computed by the first client based on the first version of the global parameter and a respective first local dataset of the first client;
determining whether the first version of the global parameter matches a most recent version of the global parameter;
based on determining that the first version of the global parameter does not match the most recent version of the global parameter, and based on determining a distance between the first gradient and a second gradient of the second client, selecting a version of the global parameter; and
aggregating the first gradient with the selected version of the global parameter to determine an updated version of the global parameter.

16. The computer program product of claim 15, wherein the second gradient is determined by the second client based on the first version of the global parameter and a respective second local dataset of the second client.

17. The computer program product of claim 16, wherein selecting the version of the global parameter based on the determined distance comprises, based on the determined distance being less than a threshold, selecting the most recent version of the global parameter.

18. The computer program product of claim 16, wherein selecting the version of the global parameter based on the determined distance comprises, based on the determined distance being greater than a threshold, selecting an earlier version of the global parameter.

19. The computer program product of claim 18 further comprising:
aggregating the first gradient with multiple versions of the global parameter to determine multiple updated versions of the global parameter; and
selecting, based on a validation dataset, a best version of the global parameter from the multiple updated versions of the global parameter.

20. The computer program product of claim 18 further comprising, based on selecting the earlier version of the global parameter:
notifying the second client to reduce an update frequency of the second client.

* * * * *